(12) United States Patent
Zeiber et al.

(10) Patent No.: US 6,840,276 B2
(45) Date of Patent: Jan. 11, 2005

(54) VENTABLE MANIFOLD

(75) Inventors: Dennis Zeiber, Erie, PA (US); Craig Price, Union City, PA (US); Nick Freund, Waterford, PA (US)

(73) Assignee: Snap-tite Technologies, Inc., Wilmington, DE (US)

(*) Notice: Subject to any disclaimer, the term of this patent is extended or adjusted under 35 U.S.C. 154(b) by 0 days.

(21) Appl. No.: 10/353,349

(22) Filed: Jan. 29, 2003

(65) Prior Publication Data

US 2004/0144436 A1 Jul. 29, 2004

(51) Int. Cl.[7] .............................................. F16L 37/28
(52) U.S. Cl. ................... 137/614.03; 137/901
(58) Field of Search ............... 137/614.03, 614.04, 137/901, 595, 599.02, 596.2; 91/464

(56) References Cited

U.S. PATENT DOCUMENTS

| | | | |
|---|---|---|---|
| 2,638,915 A | * | 5/1953 | Mitchell ................. 137/614.04 |
| 2,675,829 A | | 4/1954 | Livers |
| 3,693,655 A | * | 9/1972 | Frisk ........................ 137/599.1 |
| 3,710,823 A | | 1/1973 | Vik |
| 3,730,221 A | * | 5/1973 | Vik ........................... 137/614 |
| 3,886,970 A | * | 6/1975 | Barlow et al. ........... 137/561 R |
| 4,009,729 A | | 3/1977 | Vik |
| 4,077,433 A | | 3/1978 | Maldavs |
| 4,181,150 A | | 1/1980 | Maldavs |
| 4,249,572 A | | 2/1981 | Shindelar |
| 4,303,098 A | | 12/1981 | Shindelar |
| 4,314,592 A | * | 2/1982 | Silvey ......................... 137/901 |
| 4,347,870 A | | 9/1982 | Maldavs |
| 4,373,551 A | | 2/1983 | Shindelar |
| 4,598,896 A | | 7/1986 | Maldavs |
| 4,763,875 A | | 8/1988 | Chew |
| 4,852,352 A | * | 8/1989 | Leigh-Monstevens ........ 60/585 |
| 4,881,371 A | * | 11/1989 | Haeder et al. ................ 60/431 |
| 4,881,573 A | | 11/1989 | Durant |
| 5,251,666 A | | 10/1993 | Kimball et al. |
| 5,918,633 A | | 7/1999 | Zeiber |
| 6,016,835 A | | 1/2000 | Maldavs |
| 6,095,190 A | | 8/2000 | Wilcox et al. |
| 6,116,277 A | | 9/2000 | Wilcox et al. |

* cited by examiner

Primary Examiner—John Fox
(74) Attorney, Agent, or Firm—Woodling, Krost and Rust

(57) ABSTRACT

A ventable manifold is disclosed and claimed. Coupling halfs are affixed to coupler ports in the manifold. An actuator having a cam thereon resides in a longitudinal bore in the manifold body and is moveable between first and second positions therein. The manifold includes at least one coupler port and at least one body port for supplying energized fluid to a load. A first passageway is in communication with the coupler port and the body port. A second passageway is in communication with a relief port and the first passageway. A valve is interposed in the second passageway and is in sliding engagement with the cam of the actuator such that when the actuator is in the first position the valve is closed such that when the actuator is in the second position the valve is open. Another embodiment includes a rotatable actuator which can selectively relieve one hydraulic circuit or another.

16 Claims, 13 Drawing Sheets

VENTABLE MANIFOLD

FIELD OF THE INVENTION

The invention is in the field of manifolds used on construction and agricultural tractors. Alternatively, the invention may be used on construction and agricultural implements driven by construction and agricultural tractors. The invention is also useable on other types of tractors and implements.

BACKGROUND OF THE INVENTION

Tractors used in construction and agricultural applications have power plants such as hydraulic pumps driven by the tractor engine. Typically, hydraulic reservoirs also reside on the tractor. A hydraulic line from the pump on the tractor is connected to a directional control valve. A return line from the directional control valve goes back to the reservoir. The directional control valve has two outputs with hydraulic lines attached thereto. Each of the hydraulic lines has a coupling affixed thereto which mates with a reciprocal coupling half on lines from an implement which is driven by the tractor's pump. In other words, couplings are used to connect and disconnect hydraulic lines which run the implement.

When the implement is disconnected from the tractor two potential problems are created. First, hydraulic fluid in the supply, return or the supply and return lines downstream of the directional control valve may be hydraulically locked which makes coupling of those lines to the coupling halves of the implement difficult if not impossible. Second, ambient heat from the air and radiant heat from the sun cause the fluid in the disconnected driven piece of equipment (implement) and its connecting hydraulic lines to increase in temperature and pressure thus making it difficult to connect the hydraulic pressure source to the hydraulic load (driven equipment). Usually the implement has two couplings, one for the power line supplying the load and the other for the return line which sends the fluid back to the directional control valve. Increased temperature and pressure of the fluid in the couplings and the hydraulic lines to the load make the couplings difficult to reconnect upon subsequent operation of the implement.

U.S. Pat. No. 2,675,829 to Livers discloses a quick-disconnect coupling with a selectively operable valve.

U.S. Pat. No. 4,881,573 to Durant illustrates a coupler having two poppet valves. The first poppet engages a ball check valve formed in the male coupling and the second poppet is actuated by a manually operated cam. A passageway exists in the piston to allow fluid to be vented or to pressurize the female valve.

U.S. Pat. No. 4,598,896 to Maldavs illustrates a coupler having a spool and a port within the spool. An annular seal is fixedly positioned about the port in the spool. The spool is slidable with respect to the seal which enables pressure to be relieved in the female during coupling and uncoupling with the male.

U.S. Pat. No. 4,303,098 to Shindelar discloses a coupler having a female half which includes a female valve having an elongated stem for engaging the male half. The female half of the coupling is vented by a pivotable cam which moves the inner member of the female half to release its locking means and then opens a poppet valve to open the outlet port.

U.S. Pat. No. 4,249,572 to Shindelar et al. discloses a female half which is self-relieving. The female half includes dual poppet valves which are linked together. One of the poppet valves vents the female half of the coupling when the male and female valves are disengaged and uncoupled.

U.S. Pat. No. 4,181,150 to Maldavs recites that quick disconnect couplings are frequently used on agricultural implements to connect hydraulic hoses for conveying pressurized hydraulic fluid. The Maldavs '150 patent goes on to state that agricultural tractors have hydraulic systems which are connected to agricultural implements.

Maldavs' '150 patent discloses a lever-type quick disconnect female coupling for co-action with a check valve equipped male coupling. A movable valve member actuated by the lever functions as a sealing valve for the female coupling and as a push member for opening the check valve of the male coupling. Maldavs' '150 patent recites that lever-type quick disconnects were developed to overcome the problem of connecting or disconnecting coupler halves under pressure. However, according to the Maldavs '150 patent, lever-type couplings are no panacea because they can interfere with the flow of fluid through the coupling and experience other problems.

U.S. Pat. No. 4,347,870 was issued to Maldavs and discloses a quick disconnect female coupling with a lever-operated valve. The lever operates a cam inside the coupling which pulls open the valve assembly of the female coupling and pushes a plunger which opens the valve of a male coupling which is connected to the female coupling. The cam is positioned within a large flow passage in the female coupling.

U.S. Pat. No. 6,016,835 to Maldavs discloses an inner valve spool having an end which is engageable by a lever-operated cam to move the inner valve spool relative to the outer spool and allow fluid in the female housing to flow out through ports and be relieved.

U.S. Pat. No. 3,710,823 to Vik discloses two hydraulic couplers operable by a cam actuator. Couplers are affixed to a mounting bracket which in turn is affixed to a tractor. The couplers use a cam actuator which move coupler portions to a position wherein the fluid flow through the couplers is shut off while the coupler parts remain mechanically connected. The coupler members move internally to permit connection of the coupler halves under pressure.

U.S. Pat. No. 4,009,729 to Vik discloses a hydraulic coupler having an intermediate valve which permits closing off flow from the inlet end to the outlet end. The valve is actuated by a handle affixed to a cam. The cam also actuates a piston which moves to enlarge a chamber which relieves pressure in the chamber to permit connection of the coupling halves under pressure.

U.S. Pat. No. 4,373,551 to Shindelar discloses a lever-actuatable cam which can vent two female coupling halves. The cam actuates valves located in the end of the female coupling halves.

U.S. Pat. No. 5,918,633 to Zeiber discloses a female coupling which resides in a housing and which includes an inner body. Movement of the inner body of the female portion moves the relief valve positioning member axially away from the male member opening the relief valve and venting the female member through the housing.

U.S. Pat. No. 6,095,190 to Wilcox et al. discloses a female half having a main valve, a relief valve and a sliding sleeve valve. The relief valve is designed to reduce pressure behind the main valve so as to permit easy coupling under pressure when the female half is under pressure. Pressure relief is accomplished within the couplings.

U.S. Pat. No. 6,116,277 to Wilcox et. al discloses a coupling useable on farm implements having a metal to metal vent valve in the female half of the coupling. The female half of the coupling is vented when the female half is disconnected or partially disconnected from the male half. When the male half is being coupled with the female half the female half is vented thus making coupling easy.

There is a need for a tractor mounted manifold which can vent the hydraulic lines between the directional control valve and the manifold enabling connection of coupling halves mounted on the manifold to coupling halves mounted on the hydraulic lines of the implement.

There is a need for an implement mounted ventable manifold having coupling halves affixed thereto. The implement and the manifold attached thereto maybe separated from the tractor which supplies the hydraulic power to the manifold and the implement. There is a need to vent the manifold so as to enable easy recoupling of the hydraulic lines from the power source to the couplings on the implement mounted manifold.

Alternatively, there is a need for two ventable manifolds each having coupling halves affixed thereto, one manifold being mounted on a tractor and one manifold being mounted on an implement. In this way the hydraulic supply and return lines of the implement and the tractor may be vented.

SUMMARY OF THE INVENTION

A ventable manifold which includes a manifold body is disclosed. The manifold includes a first passageway in communication with a first coupler port and a first threaded port. Sometimes herein the term "body port" is used instead of the term "threaded port". The invention as disclosed and claimed herein specifically contemplates a port that does not have threads thereon. For instance the body port could conceivably have a different configuration for a fluid joint of many different types. Those skilled in the art will readily recognize that many different fluid joints other than threaded joints may occupy the body ports disclosed and claimed herein and sometimes identified by the term threaded port.

All coupler ports have a coupling half affixed thereto and all threaded ports have a hydraulic hose with a fitting thereon affixed thereto. The manifold further includes a second passageway in communication with the first passageway and longitudinal bore. The longitudinal bore is in communication with a fifth passageway and ultimately leads to a third threaded port (relief port) and a third coupler port (which has a relief coupler affixed thereto). A valve is interposed in the second passageway. The valve is in sliding engagement with the cam of the actuator such that: (1) when the actuator is in a first position the valve is closed; and, (2) when the actuator is in a second position the valve is open. The cam includes a ramp angle which actuates the valve when the actuator is in the second position.

The manifold further includes a second coupler port and a second threaded port interconnected by a third passageway. The manifold further includes a fourth passageway in communication with the third passageway and the longitudinal bore. The longitudinal bore is in communication with a fifth passageway and ultimately leads to a third coupler port and to a third threaded port (relief port). A second valve is interposed in the fourth passageway. The second valve is in sliding engagement with the cam of the actuator such that: (1) when the actuator is in a first position the second valve is closed; and, (2) when the actuator is in a second position the second valve is open.

The second and fourth passageways communicate with the longitudinal bore in which the actuator resides. The longitudinal bore in turn communicates with a fifth passageway. The fifth passageway leads to a sixth passageway which, in turn, communicates fluid to a third coupler and a third threaded port (relief port).

The valves are typically ball valves but those skilled in the art will readily recognize, upon reading the disclosure herein, that other types of valves may be used without departing from the spirit and scope of the claimed invention. Posts are affixed in the manifold body and these posts act as supports for spring-loaded (spring-biased) plungers which urge the ball valves against valve seats in the body. The posts partially reside in the second and fourth passageways which are oriented latitudinally and they also traverse the first and third passageways respectively but do not obstruct the first and third passageways appreciably.

A cam exists on one end of the actuator and the cam engages the first and second ball valves. The cam includes a ramp angle which actuates the valve when the actuator is in the second position. The actuator which is manually operated is retained in the body by a snap-ring. An actuator spring operable between a shoulder in the longitudinal bore and a shoulder on the actuator maintains the actuator in its normal first position (not depressed condition). The second position (depressed condition) of the actuator results in venting of the manifold and the equipment associated with it under certain conditions. Optionally, a polymeric actuator cover may be fitted over the actuator and secured to a lip in the body of the manifold.

Another embodiment of the invention enables the selective venting of one or the other hydraulic lines. A rotatable hydraulic actuator includes a cam which engages one or the other valves opening same. In this embodiment the cam may only actuate one valve at a time.

Ventable Manifold Tractor Mounted

The ventable manifold is typically mounted on a tractor which may be separated from an implement which is hydraulically driven by a pump on the tractor. An actuator having a cam thereon resides in a longitudinal bore in the manifold body. The actuator is moveable between first and second positions within the longitudinal bore in the manifold body. The manifold body includes coupler ports having coupler halves affixed thereto. The manifold also includes threaded ports which are typically interconnected (by hydraulic hoses) with a directional control valve on the tractor and a hydraulic line back to the reservoir on the tractor. Two coupler halves are connected to reciprocal coupler halves on hydraulic lines form the implement. A third coupler half is connected to a reciprocal coupler half on a hydraulic line from a case vent on the implement. The coupler halves can be either a male or female.

The power source may be a tractor or a smaller version of a tractor such as a skid loader or wheel loader.

Ventable Manifold Implement Mounted

In the instance of an implement mounted ventable manifold, the ventable manifold is essentially oriented oppositely to the tractor mounted installation. The coupler halves of the manifold are coupled to reciprocal halves which are connected to hydraulic lines (hoses) connected to the directional control valve and the reservoir. The threaded ports on the manifold secure hydraulic lines (hoses) which are connected with the implement.

It is an object of the present invention to provide a manifold which can vent a hydraulic circuit.

It is an object of the present invention to provide a manifold which can simultaneously vent two hydraulic lines.

It is an object of the present invention to provide a manifold which can selectively vent one of two hydraulic lines.

It is an object of the present invention to provide a ventable manifold which can be mounted on a tractor for venting the manifold and hydraulic lines affixed thereto.

It is an object of the present invention to provide a ventable manifold which can be mounted on an implement for venting the manifold and hydraulic lines affixed thereto.

These and other objects will be best understood when reference is made to the Brief Description of the Drawings and the Description of the Invention and claims which follow hereinbelow.

Figure 1:
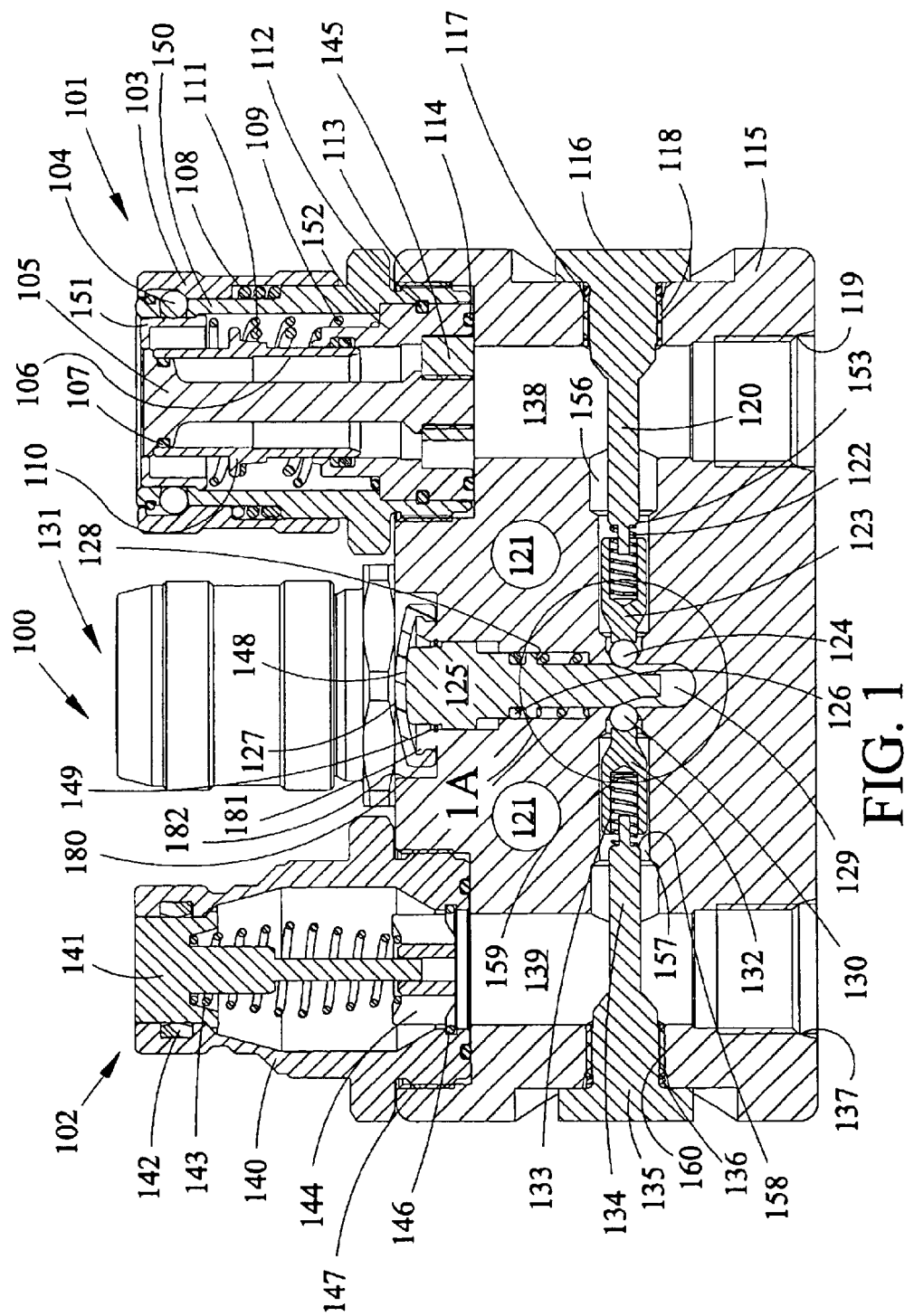
FIG. 1 is a cross-sectional view of the ventable manifold along the lines 1—1 of FIG. 3.

The drawing figures and the invention will be better understood when reference is made to the Description of the Invention, and claims which follow hereinbelow.

DESCRIPTION OF THE INVENTION

Figure 3:
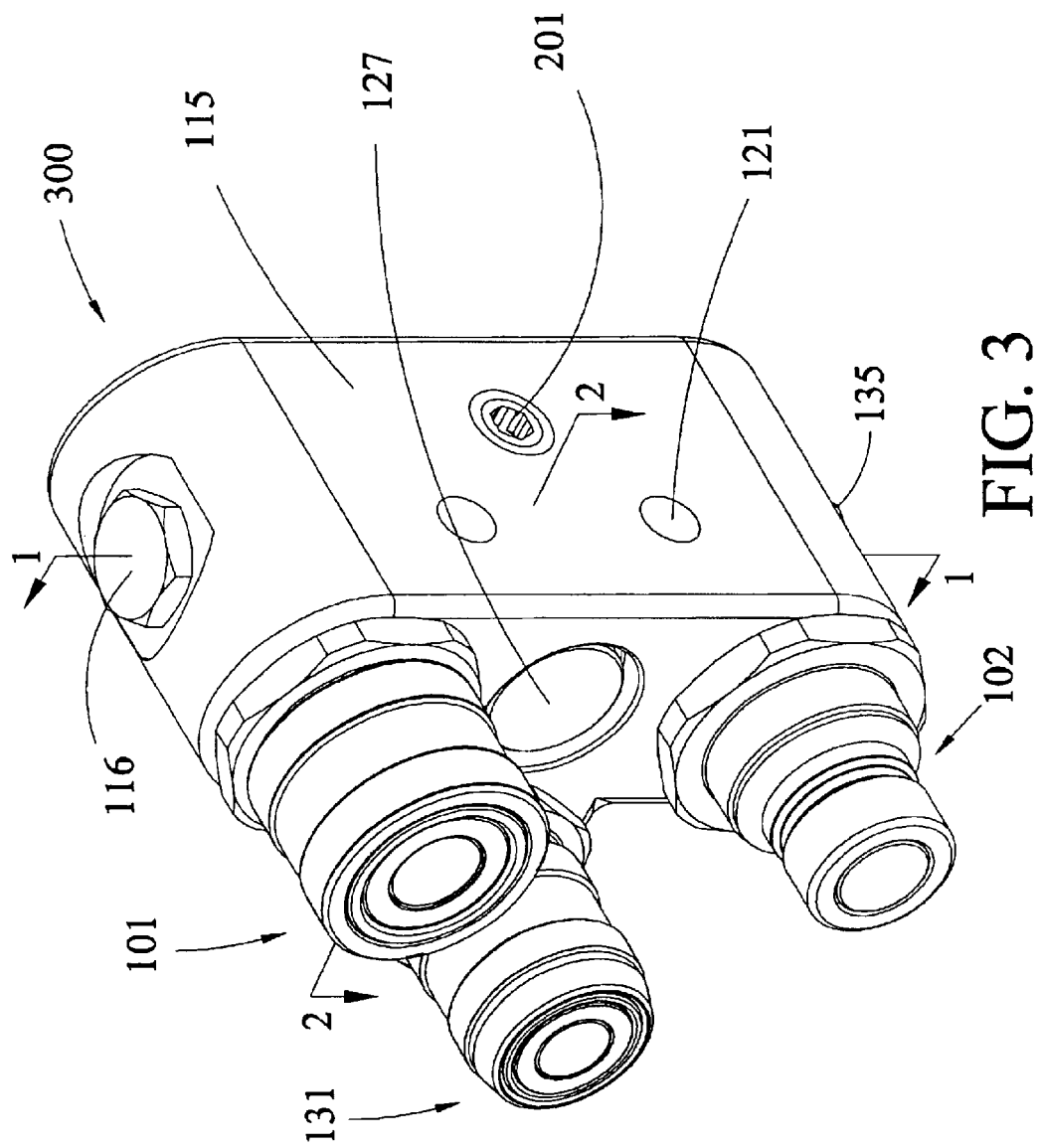
FIG. 3 is a perspective view of the ventable manifold.

FIG. 3 is a perspective view 300 of the first embodiment of the ventable manifold. Female coupling half 101, male coupling half 102 and female relief coupling half 13 are illustrated extending from manifold body 115. Female coupling half 101 and male coupling half 102 are coupled in operation to reciprocal hydraulic coupling halves as illustrated in the schematics of FIGS. 1B and 1C. Reference numeral 121 indicates mounting holes whereby the ventable manifold may be secured to a tractor or implement.

FIG. 1B is a schematic 100B of a hydraulic circuit wherein the ventable manifold 100 is tractor mounted. FIG. 1B schematically illustrates manifold 100 installed on a tractor. Directional control valve 196 directs pressurized fluid from pump 197 to either hydraulic line 194 or 195 depending on the desired direction of implement 190. Threaded ports 137, 119 and 204 on manifold 100 receive hydraulic lines. Referring still to FIG. 1B and manifold 100, first threaded port 137 internally communicates with first coupling half 102 and second threaded port 119 internally communicates with second coupling half 101. Third threaded port 204 (relief port 204) communicates internally with coupler half 131. Relief port 204 and coupler half 131 also communicate with the other threaded ports and coupler halves as will be explained hereinbelow.

Still referring to FIG. 1B, reference numeral 199 signifies the reservoir. Reciprocal coupling halves 102B, 131B and 101B with hydraulic lines 191, 192 and 193 transmit fluid to and vent the implement as described hereinbelow. Coupling halves 102, 131 and 101 can be male, female or a mixture of both and coupler halves 102B, 131B and 101B are reciprocals enabling coupling.

FIG. 1C is a schematic 100C of a hydraulic circuit wherein the ventable manifold 100 is implement mounted. FIG. 1C illustrates the manifold essentially oriented oppositely as compared to the installation/orientation of FIG. 1B. In FIG. 1C the implement mounted manifold 100 has threaded ports 137, 204 and 119 communicating via hydraulic lines 191, 192 and 193 with the implement 190. Coupler halves 102, 131 and 101 communicate with reciprocal coupling halves 102C, 131C and 101 which, in turn, communicate with the directional control valve 196 and reservoir 199 via hydraulic lines.

Buffon or cover 127 is illustrated in FIG. 3 and it is this button which is depressed by the operator when it is desired to relieve pressure within the manifold so as to enable coupling of the coupling halves 101 and 102. When button 127 is depressed or pushed, fluid pressure will be relieved inside the manifold and fluid will flow out of the relief port 204 if there is sufficient fluid in the system.

Still referring to FIG. 3, if coupling halves 101 and 102 are coupled to reciprocal halves when the actuator is moved to its second position, then those halves as well as the lines (hydraulic hoses) connected thereto will be depressurized and, depending on their elevational position they may be drained.

FIG. 3 further illustrates the outer portions of posts 116, 135 whose structure and function will be explained hereinbelow. Plug 201 is threaded 202 into manifold body as is best illustrated in FIG. 2.

Figure 1A:
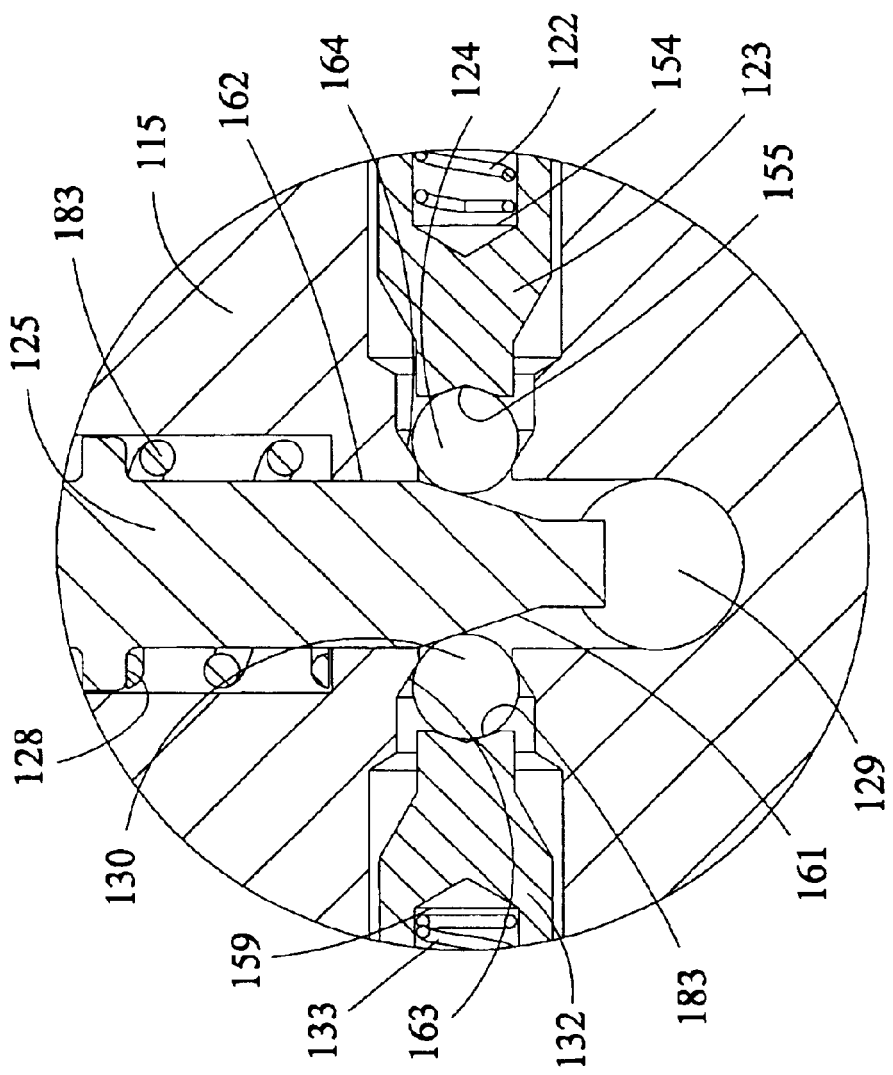
FIG. 1A is an enlargement of a portion of FIG. 1.
Figure 2:
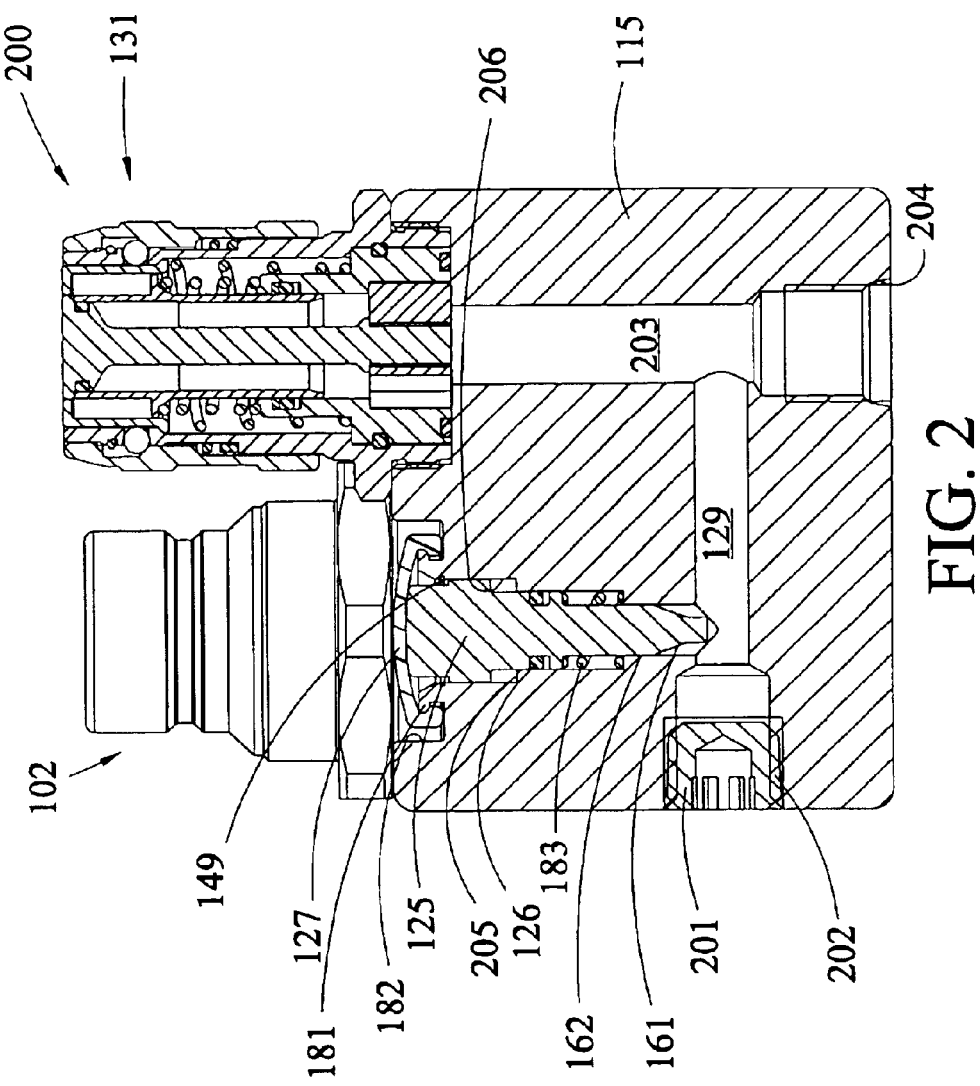
FIG. 2 is a cross-sectional view of the ventable manifold along the lines 2—2 of FIG. 3.

FIG. 2 is a cross-sectional view 200 of the ventable manifold 115 along the lines 2—2 of FIG. 3. FIG. 2 illustrates shoulder 205 on the longitudinal bore 206 in which actuator 125 resides. Actuator 125 is shown in its first position. When actuator button 127 is depressed, actuator 125 proceeds downwardly against the force of spring 183. Spring 183 is operable between manifold body 115 and shoulder 128 on actuator 125. See, FIG. 1A, an enlargement of a portion of FIG. 1. Actuator 125 is retained in manifold body 15 by snap ring 149.

Figure 1B:
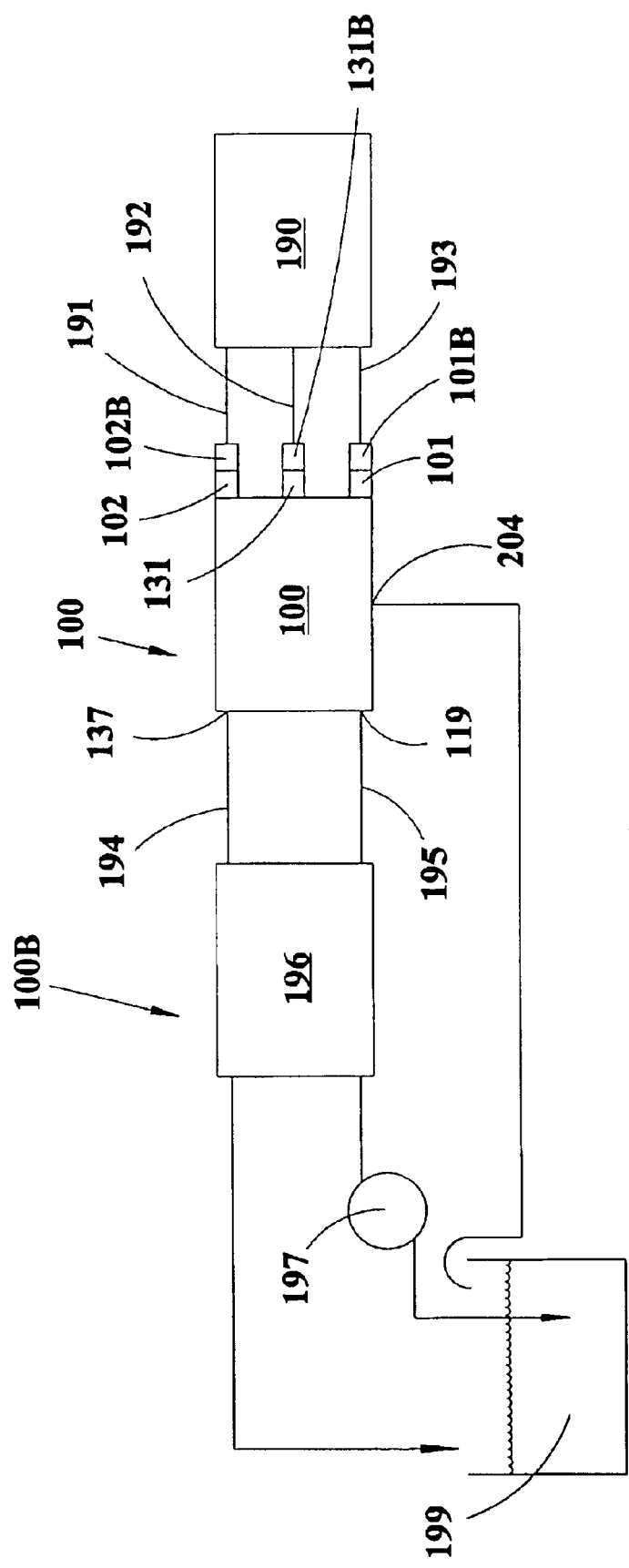
FIG. 1B is a schematic of a hydraulic circuit wherein the ventable manifold is tractor mounted.
Figure 1C:
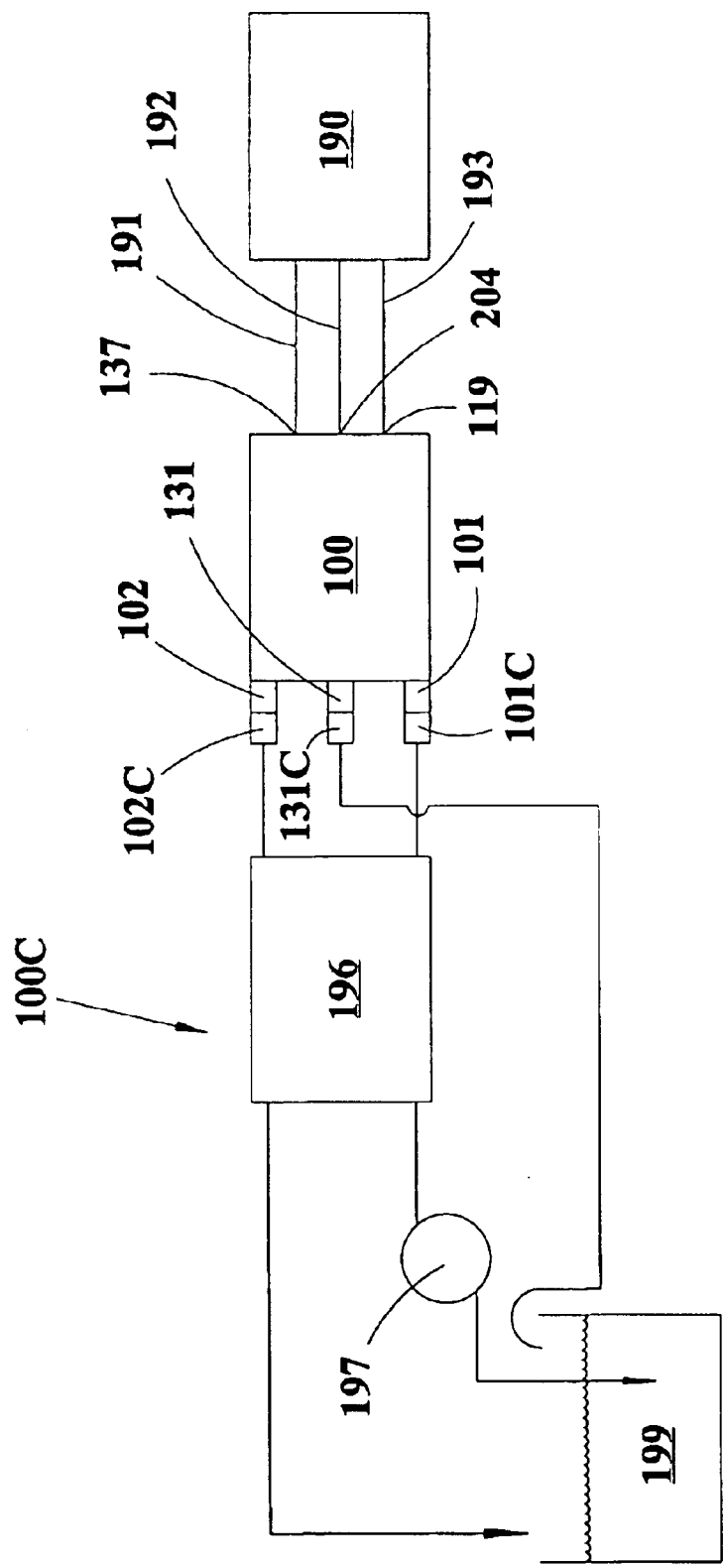
FIG. 1C is a schematic of a hydraulic circuit wherein the ventable manifold is implement mounted.

Referring to FIG. 1A, sloped cam 161 is shown engaging ball valves 130, 124. As actuator 125 is pushed downwardly, a constant diameter portion 162 of actuator 125 engages ball valves 130, 124 and pushes them away from their respective seats 163, 164 in manifold body 115. See, FIG. 1A, an enlargement of a portion of FIG. 1.

FIG. 1 is a cross-sectional view 100 of the ventable manifold along the lines 1—1 of FIG. 3. Well 182 in manifold body 115 houses polymeric cover 127 which is snap fit over lip 181 of the manifold body 115 and the convex, dome shaped top 148 of actuator 125. Lip 181 is formed by circumferential groove 180 in manifold well 182. See, FIGS. 1, 2, and 3.

Referring to FIGS. 1, 1A, and 2, when button 127 is pushed by the operator the actuator cam surface 161 and the constant diameter surface 162 force the ball valves 130, 124 from their respective seats 163, 164 against the force of spring 133, 122 biased plungers or poppets 132, 123 which permits communication in passageways 157 (second passageway) and 156 (fourth passageway). First passageway 139 permits communication between first threaded port 137 and the first coupler port (unnumbered) which is occupied by nipple half 102. Similarly, second passageway 138 permits communication between second threaded port 119 and second coupler port (unnumbered) which is occupied by coupler half 101.

The longitudinal bore 206 interconnects second passageway 157 and fourth passageway 156 with the fifth passageway 129 when the actuator 125 is depressed. Seal 126 in bore 206 prevents leakage of fluid from the bore 206. Posts 135, 116 reside latitudinally in second 157 and fourth 156 passageways and occupy some of the volume of the second 157 and fourth 156 passageways. Springs 133, 122 are operable between shoulders 158, 153 on posts 135, 116 and interior shoulders 159, 154 of plungers 132, 123. See FIGS. 1 and 1A. The first and third passageways are vented when the actuator 125 is depressed. Pressurized fluid in first passageway 139 is evacuated or unstressed when a vent path along, for example the second passageway 157, the longitudinal bore 206, and the fifth passageway 129 is enabled by opening ball valve 130 with the actuator 125. Similarly, pressurized fluid in third passageway 138 is evacuated or unstressed when a vent path along the fourth passageway 156, the longitudinal bore 206, and the fifth passageway 129 is established by opening ball valve 124 with the actuator 125. Fluid will flow out sixth passageway 203 and out coupler half 131 or out port 204. See, FIG. 2.

Referring to FIG. 1A, balls 130 and 124 are seated on seats 183, 155 of their respective plungers 132, 123. As illustrated in FIG. 1A, balls 130 and 124 engage valve seats 163, 164 and prohibit flow from the second 157 and fourth 156 passageways. Referring to FIG. 1, when actuator 125 is depressed pressurized fluid enters the longitudinal bore 206 and its escape is prevented by seal 126 which resides between manifold body 115 and actuator 125. When actuator 125 is depressed, poppets 132, 123 move against the force of their respective springs allowing hydraulic fluid to flow along reduced diameter sections 134, 120 of posts 135, 116 respectively. Since the diameter of poppets 132, 123 is less than the diameter of passageways 157, 156 hydraulic fluid may flow freely past the poppets. Further, since hydraulic fluid is largely incompressible there will be many instances where the pressure may be relieved in the hydraulic circuit without much flow past the poppets or the ball valves.

Posts 135, 116 are secured to body 115 by threaded interconnections 160, 118. Seals 136, 117 prevent leakage by posts 135, 116. Referring to FIG. 1, posts 135, 116 do not obstruct the first passageway 139 and the third passageway 138 as the diameter of the posts is small relative to the diameter of the cylindrical passageways where they traverse the passageways.

Referring to FIG. 1, coupler half 101 has body 150 affixed to manifold body 115 by a threaded interconnection 113. Seal 114 prevents leakage from the coupler body 150 and manifold body 115 interface. A nipple could be used in place of the coupler half 101 if so desired by the user of the manifold. Coupler half 101 includes a pintle 105, locking balls 104, a retractable outer sleeve 103 on the coupler for releasing locked coupling halves, support 145, seals 106, 107, and 112 and a retainer 151. Spring 108 is operable between the body 150 and retractable outer sleeve 103 and spring 109 is operable between adapter 152 and sliding sleeve 110. Spring 111 is operable between adapter 152 and sliding sleeve 110. If pressure exists in third passageway 138 it is applied to the underside of pintle 105 such that coupling with a male half prior to venting is difficult.

Referring to FIG. 1, nipple 102 includes body 140, poppet 141, support 144, and a threaded interconnection 147 for securing the nipple to the manifold body 115. Instead of affixing a nipple half (male half) of a coupling to the manifold body 115 at this location, another coupler half such as the coupler half (female half) 101 may be used. Snap ring 146 secures support 144 to body 140. A spring 143 is operable between support 144 and poppet 141. Seals such as seal 142 between the poppet 141 and the body 140 are used to ensure that no leakage from the manifold body 115 occurs. As is the case with coupler half 101, pressure applied to the underside of poppet 141 makes connection difficult.

When the cover 127 is depressed plunger 125 travels downwardly in longitudinal bore 206 and cam 161/162 actuates ball valves 130, 124 pushing them away from their respective seats permitting flow in second 157 and fourth 156 latitudinal passageways. All of the passageways described herein are generally cylindrical passageways.

Figure 4:
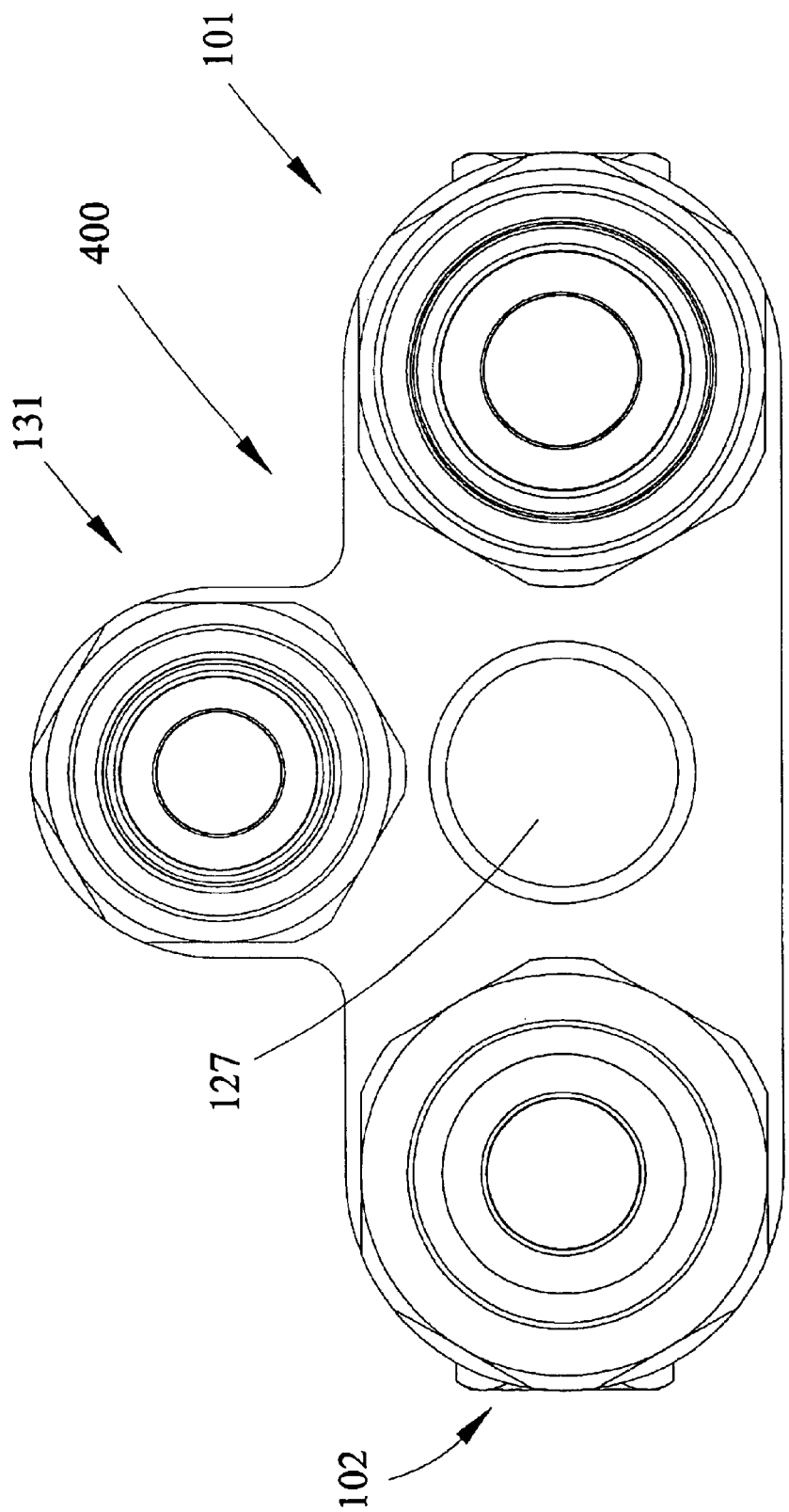
FIG. 4 is a top view of the ventable manifold.

FIG. 4 is a top view 400 of the ventable manifold. Indicia may be added to the polymeric push button cover 127 or to the body 115 of the manifold instructing the operator to depress the button to relieve pressure prior to coupling halves 101/102. The preferred material of the manifold is corrosive resistant so as to prevent or minimize rust as the manifold will be used outdoors.

Figure 5:
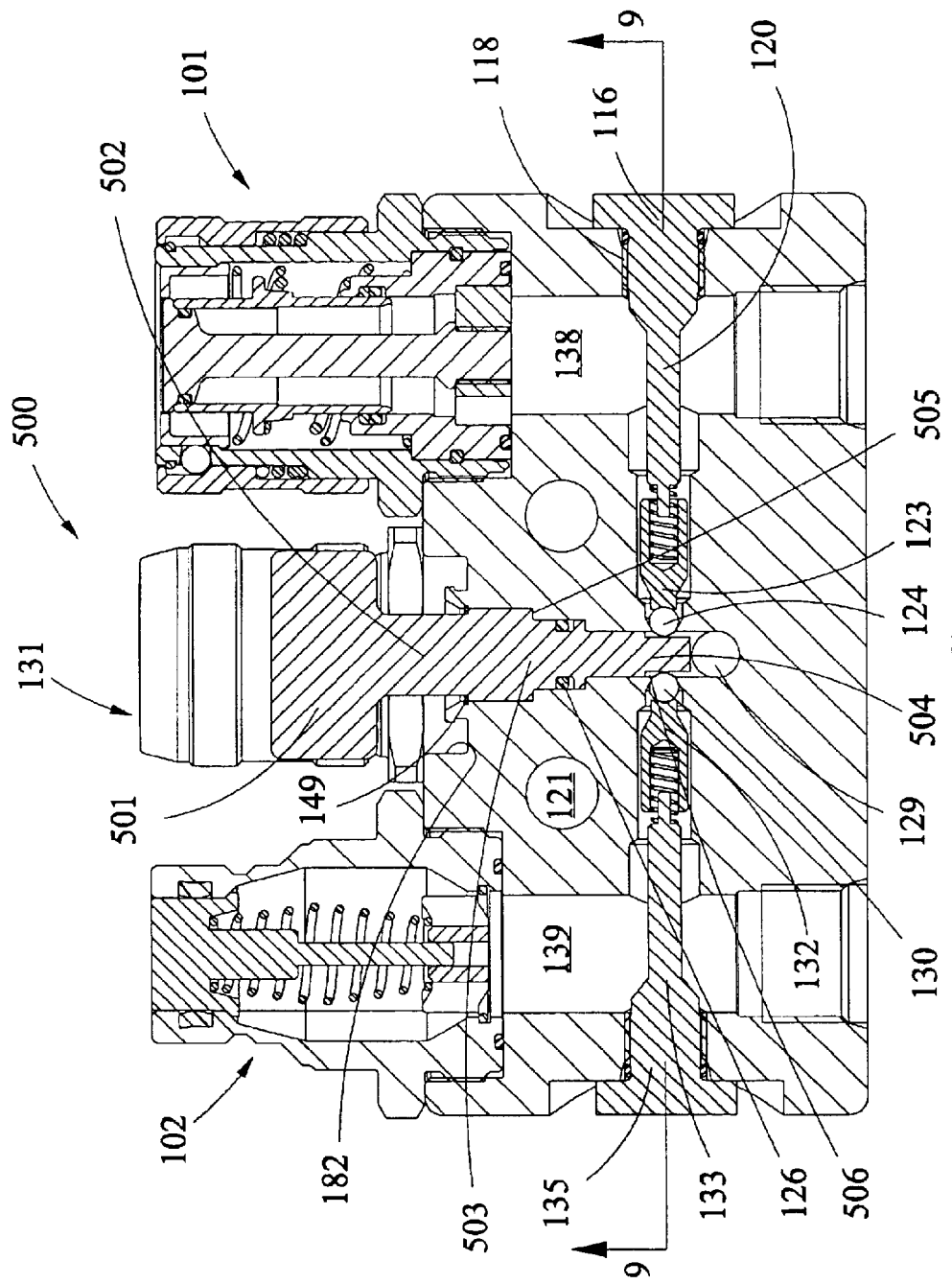
FIG. 5 is a cross-sectional view of a second embodiment of the ventable manifold taken along the lines 5—5 of FIG. 6.
Figure 6:
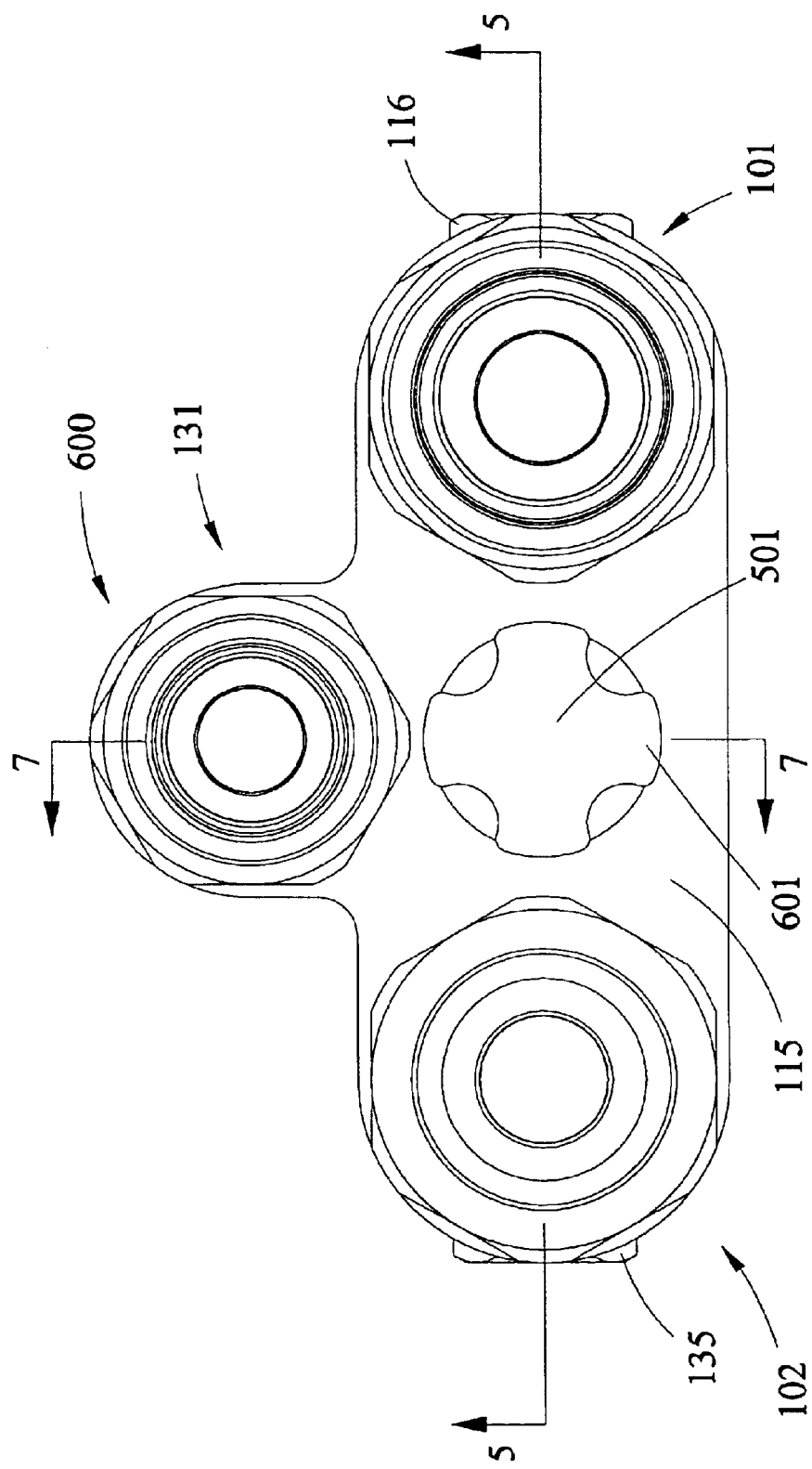
FIG. 6 is a top view of a second embodiment of the ventable manifold.

FIG. 5 is a cross-sectional view 500 of a second embodiment of the ventable manifold taken along the lines 5—5 of FIG. 6, which is a top view 600 of a second embodiment of the ventable manifold. The second embodiment of the invention enables selective venting of one of the passageways 139, 138. Actuator 503 is not moveable longitudinally (up and down) as is the case with the first embodiment. Actuator 503 is retained by snap ring 149 and shoulder 505 on the longitudinal bore 506. Intermediate portion of the actuator 502 extends through well 182 in the manifold body 115. A knob 501 having lobes 601, best viewed in FIGS. 6 and 8, is rotatable which results in the rotation of cam 504 best viewed in FIGS. 7, 9 and 10. Those skilled in the art will readily recognize that the knob may take on different shapes, sizes and contours without departing from the spirit and scope of the invention. Venting of the first passageway or the third passageway along the longitudinal bore 206 and flow passageways is identical as to that described above in connection with the cam of the first embodiment.

Figure 9:
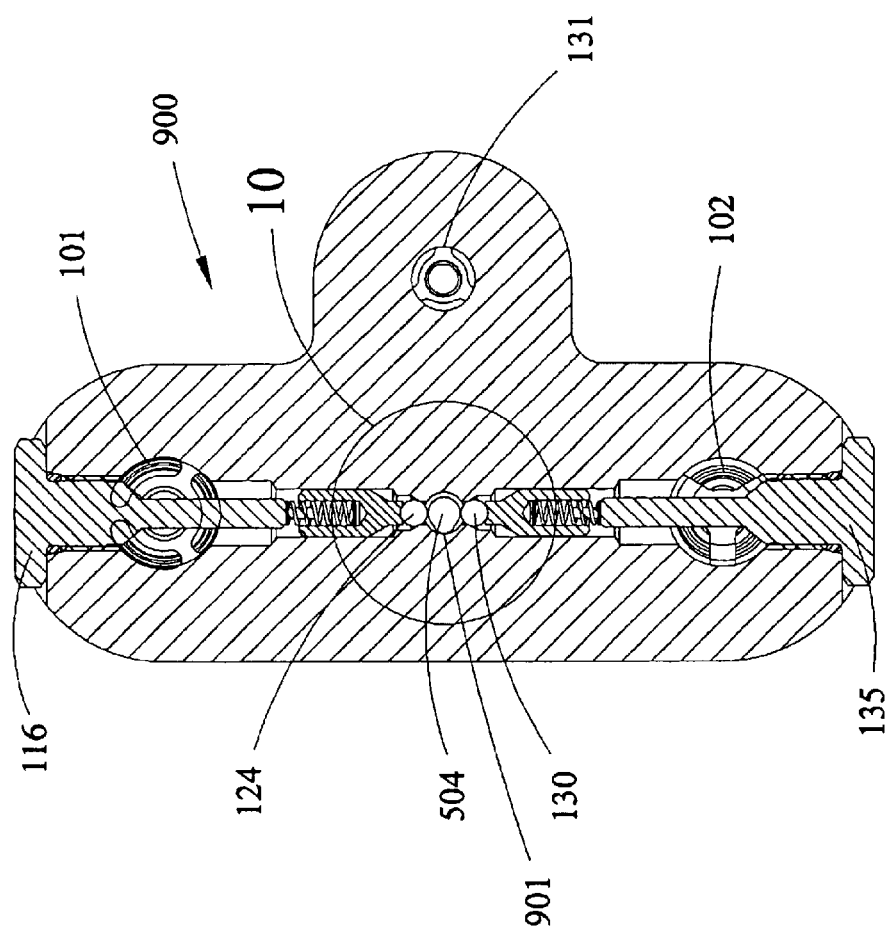
FIG. 9 is a cross-sectional view of the second embodiment taken along the lines 9—9 of FIG. 5.
Figure 10:
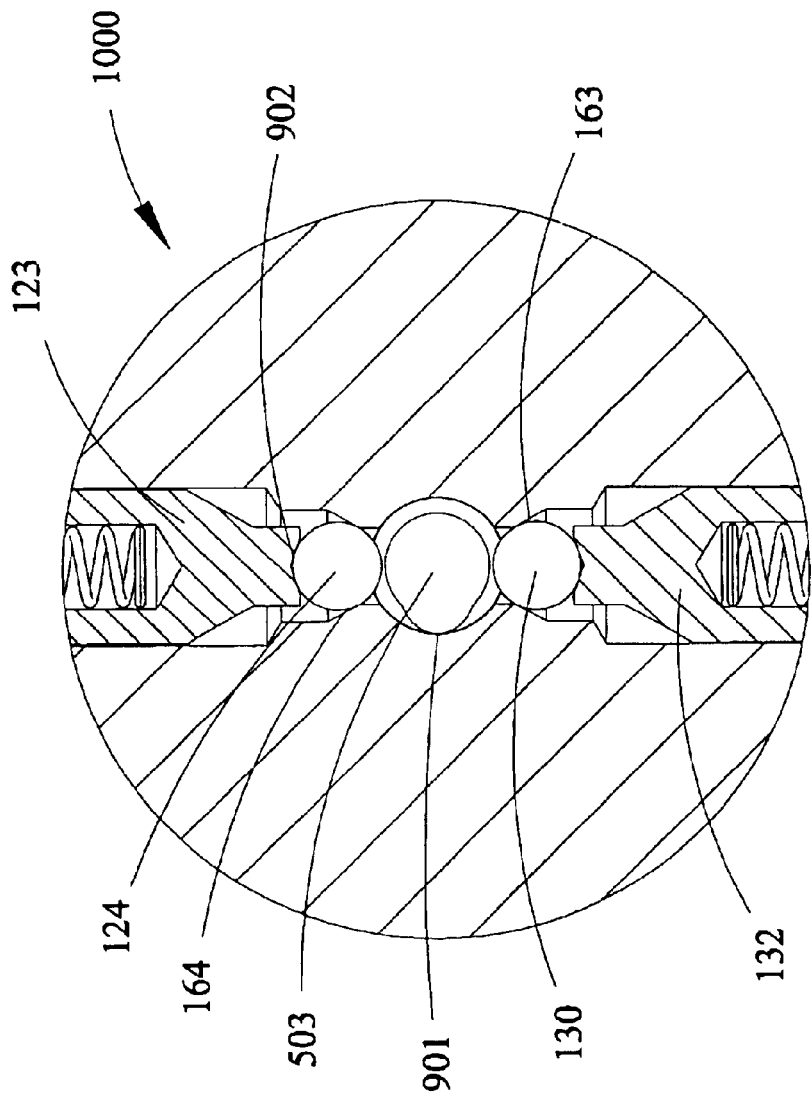
FIG. 10 is an enlargement of a portion of FIG. 9.

Cam 504 is best viewed in FIGS. 9 and 10. As actuator knob 501 is manually rotated 90 degrees by an operator's hand, the operator can selectively vent one or the other of the passageways 139, 138. Additionally, after the knob has been rotated to a position so as to selectively vent one of the passageways it may then be rotated to another position 180 degrees to selectively vent the other passageway. Indicia such as arrows may be added to the manifold body and the knob 501 to indicate and advise the operator as to the proper rotational position for venting one or the other couplings/passageways.

Figure 7:
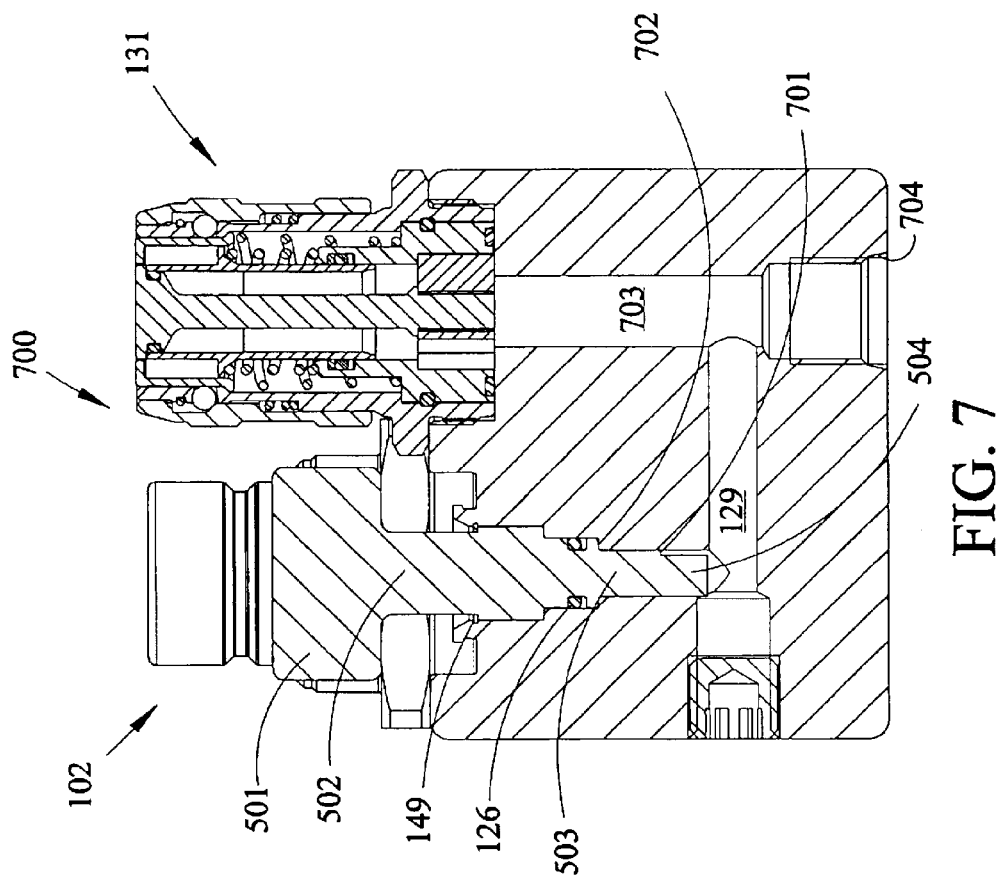
FIG. 7 is a cross-sectional view of a second embodiment taken along the lines 7—7 of FIG. 6.
Figure 8:
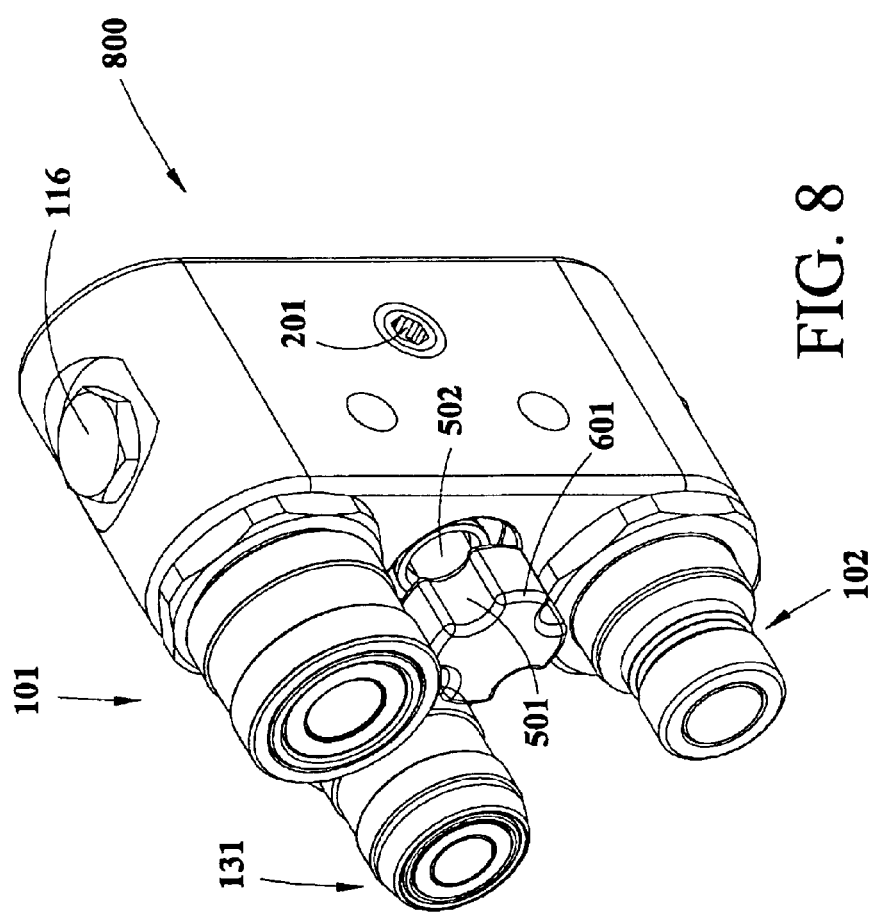
FIG. 8 is a perspective view of the second embodiment of the ventable manifold.

FIG. 7 is a cross-sectional view 700 of the second embodiment taken along the lines 7—7 of FIG. 6. Notch or shoulder 701 on cam 504 indicates a portion of the cam which is cut-away or removed so as to enable rotation of the cam 90 degrees to actuate one but not the other ball valve. Shoulder 702 on cam 503 as illustrated in FIG. 7 positions the polymeric seal 126 so as to prevent leakage between the actuator and the longitudinal bore. Passageway 703 and port 704 are structurally and functionally the same as described in connection with FIG. 2, reference numerals 203 and 204.

FIG. 8 is a perspective view 800 of the second embodiment of the ventable manifold. FIG. 8 illustrates the knob 501 and its lobes 601 of the actuator 503.

FIG. 9 is a cross-sectional view 900 of the second embodiment taken along the lines 9—9 of FIG. 5. Reference numeral 901 illustrates lobe 901 which operates one of the ball valves at a time. FIG. 10 is an enlargement of a portion of FIG. 9. Reference numeral 902 in FIG. 10 illustrates the concavity of one of the plungers which supports the ball valve.

A method of venting a manifold to enable coupling of at least one coupling half affixed to said manifold is disclosed herein. An actuator is retained in the body. The actuator has a cam thereon and is moveable between a first position and a second position. The method comprises the steps of: moving the actuator from the first position to the second position; engaging the cam with the valves opening same; interconnecting the first passageway, the second passageway and the relief port; and, interconnecting the third passageway, the fourth passageway and the relief port.

Another method of venting a manifold to enable coupling of at least one coupling half affixed to the manifold is disclosed herein. An actuator having a cam thereon is secured in the manifold body and is rotatably moveable between a first position, a second position and a third position. The method comprises the steps of: moving, selectively, the actuator from the first position to one of the second or third positions; engaging, selectively, the cam with one of said valves opening one of same; interconnecting, selectively, the first passageway, the second passageway and the relief port or the third passageway, the fourth passageway and the relief port; and, venting, selectively, said first or third passageway.

While the invention has been described herein with particularity and detail, those skilled in the art will readily recognize that changes may be made to the invention as set forth herein without departing from the spirit and the scope of the appended claims.

We claim:

1. A ventable manifold comprising: a manifold body; said manifold body includes a first coupler part; a first body port; a first passageway interconnecting said first coupler part and said first body port; a pressure relief port; a second passageway interconnecting said first passageway and said relief port; a ball valve interposed in said second passageway; a valve seat and a first spring for urging said ball valve against said valve seat; an actuator in said body; an actuator spring operable between said body and said actuator; said actuator moveable between a first position and a second position; in said second position said actuator urges said ball valve away from said seat against the urging of said first spring allowing pressure in said first passageway to be relieved by interconnecting said first passageway, said second passageway and said relief port; and, said actuator spring urges said actuator to said first position enabling said first spring to urge said ball valve against said valve seat.

2. A ventable manifold as claimed in claim 1 wherein said actuator is manually operable.

3. A ventable manifold as claimed in claim 2 further comprising a second coupler port and a second body port and a third passageway interconnecting said second coupler port and said second body port; a fourth passageway interconnecting said third passageway and said relief port; and, a second ball valve interposed in said fourth passageway.

4. A ventable manifold as claimed in claim 3 further comprising a second valve seat and a second spring for urging said second ball valve against said second valve seat.

5. A ventable manifold as claimed in claim 4 wherein said actuator, in said second position, urges said second ball valve away from said second seat against the urging of said second spring allowing pressure in said third passageway to be relieved by interconnecting said third passageway, said fourth passageway and said relief port.

6. A ventable manifold as claimed in claim 1 wherein said actuator includes a cam thereon.

7. A ventable manifold as claimed in claim 5 wherein said actuator includes a cam thereon.

8. A ventable manifold as claimed in claim 1 wherein a coupling half is affixed to said first coupler port.

9. A ventable manifold as claimed in claim 3 wherein a coupling half is affixed to said second coupler port.

10. A ventable manifold comprising: a manifold body; an actuator having a cam thereon; a longitudinal bore in said manifold body; said actuator residing in said longitudinal bore; said actuator moveable between first and second positions within said longitudinal bore in said manifold body; said actuator includes a shoulder thereon and an actuator spring operable between said shoulder and said body urging said actuator to said first position; at least one coupler port; at least one body port; a first passageway in communication with said at least one coupler port and said body port; a relief port; a second passageway in communication with said relief port and said first passageway; a ball valve interposed in said second passageway; said second passageway includes a valve seat; a post with a shoulder thereon affixed to said manifold body; a spring operable between said shoulder on said post and said ball valve urging said ball valve into engagement with said seat; and, said ball valve being in sliding engagement with said cam of said actuator such that when said actuator is in said first position said valve is closed and such that when said actuator is in said second position said valve is open.

11. A ventable manifold as claimed in claim 10, further comprising a plunger and wherein said spring is operable between a shoulder on said post and said plunger, said ball engaging said plunger and said valve seat when said actuator is in said first position and said ball engaging said plunger and said cam on said actuator when said actuator is in said second position.

12. A ventable manifold as claimed in claim 11 further comprising a second valve, a second valve seat in said manifold, a second post affixed to said manifold, a second plunger, and a second spring operable between said second post and said second plunger, said balls engage said plungers and said valve seats when said actuator is in said first position and said balls engage said plungers and said cams on said actuator when said actuator is in said second position.

13. A ventable manifold as claimed in claim 12 wherein said actuator is manually operated.

14. A ventable manifold as claimed in claim 13 further comprising a flexible polymeric cap affixed to said manifold body and in engagement with said actuator.

15. A veritable manifold as claimed in claim 14 further comprising a snap ring and wherein said actuator is retained within said body by said snap ring.

16. A method of venting a manifold to enable coupling of at least one coupling half affixed to said manifold, said manifold includes a manifold body, said manifold body includes a coupler port, a body port, a first passageway interconnecting said coupler port and said body port, a pressure relief port, a second passageway interconnecting said first passageway and said relief port, a first ball valve interposed in said second passageway and a first spring for urging said first ball valve against a first valve seat, a second coupler port, a second body port, a third passageway interconnecting said second coupler port and said second body port, a fourth passageway interconnecting said third passageway and said relief port, a second ball valve interposed in said fourth passageway and a second spring for urging said second ball valve against a second valve seat, an actuator in said body, said actuator having a cam thereon, an actuator spring operable between said body and said actuator; said actuator moveable between a first position and a second position, in said second position said cam of said actuator urges said ball valves away from said valve seats against the urging of said first spring allowing pressure in said first and second passageways to be relieved by interconnecting them with said relief port, said actuator spring urges said actuator to said first position enabling said first and second springs to urge said ball valves against said valve seats, comprising the steps of:

moving said actuator from said first position to said second position;

engaging said cam with said valves opening same;

interconnecting said first passageway, said second passageway and said relief port;

and, interconnecting said third passageway, said fourth passageway and said relief port.

* * * * *

UNITED STATES PATENT AND TRADEMARK OFFICE
CERTIFICATE OF CORRECTION

PATENT NO. : 6,840,276 B2
DATED : January 11, 2005
INVENTOR(S) : Dennis Zeiber, Craig Price and Nick Freund It is certified that error appears in the above-identified patent and that said Letters Patent is hereby corrected as shown below:

Column 6,
Line 46, after "body", delete "15" and insert -- 115 --.

Column 9,
Lines 38 and 39, after "coupler", delete "part" and insert -- port --.

Column 10,
Line 54, after "A", delete "veritable" and insert -- ventable --.

Signed and Sealed this

Twenty-seventh Day of September, 2005

JON W. DUDAS
*Director of the United States Patent and Trademark Office*